(12) United States Patent
Goodman et al.

(10) Patent No.: US 8,255,314 B2
(45) Date of Patent: Aug. 28, 2012

(54) ELECTRONIC COMPLETION OF CASH VERSUS FUTURES BASIS TRADES

(75) Inventors: Richard P Goodman, Shoreham-by-Sea (GB); Michael Sweeting, Aldershot (GB)

(73) Assignee: BGC Partners, Inc., New York, NY (US)

( * ) Notice: Subject to any disclaimer, the term of this patent is extended or adjusted under 35 U.S.C. 154(b) by 865 days.

(21) Appl. No.: 10/940,574

(22) Filed: Sep. 13, 2004

(65) Prior Publication Data
US 2006/0059077 A1   Mar. 16, 2006

(51) Int. Cl.
*G06Q 40/00* (2012.01)
(52) U.S. Cl. ............................. 705/37; 705/35
(58) Field of Classification Search .................. 705/37, 705/35
See application file for complete search history.

(56) References Cited

U.S. PATENT DOCUMENTS

| | | | |
|---|---|---|---|
| 3,573,747 A | | 4/1971 | Adams et al. |
| 3,865,380 A | * | 2/1975 | Thomas ........................ 273/256 |
| 4,674,044 A | * | 6/1987 | Kalmus et al. .................. 705/37 |
| 5,077,665 A | | 12/1991 | Silverman et al. |
| 5,161,103 A | | 11/1992 | Kosaka et al. |
| 5,297,031 A | | 3/1994 | Gutterman et al. |
| 5,500,793 A | | 3/1996 | Deming, Jr. et al. |
| 5,727,165 A | | 3/1998 | Ordish et al. |
| 5,809,483 A | | 9/1998 | Broka |
| 5,845,266 A | | 12/1998 | Lupien et al. |
| 5,857,176 A | | 1/1999 | Ginsberg |
| 5,905,974 A | | 5/1999 | Fraser et al. |
| 5,924,082 A | | 7/1999 | Silverman et al. |
| 5,924,083 A | * | 7/1999 | Silverman et al. ............... 705/37 |
| 5,950,176 A | * | 9/1999 | Keiser et al. ................. 705/36 R |
| 6,134,535 A | | 10/2000 | Belzberg |
| 6,343,278 B1 | | 1/2002 | Jain et al. |
| 6,408,282 B1 | | 6/2002 | Buist |
| 6,418,419 B1 | * | 7/2002 | Nieboer et al. .................. 705/37 |
| 6,421,653 B1 | * | 7/2002 | May ............................. 705/36 R |
| 6,560,580 B1 | | 5/2003 | Fraser et al. |
| 7,155,410 B1 | | 12/2006 | Woodmansey et al. |
| 7,448,046 B2 | * | 11/2008 | Navani et al. .................. 719/316 |
| 7,574,395 B2 | | 8/2009 | Sweeting |

(Continued)

FOREIGN PATENT DOCUMENTS

EP    0 873 549 B1    10/1998

(Continued)

OTHER PUBLICATIONS

"Derivatives Revisited", McCarhy, Ed; Journal of Accountancy: May 2000; 189. 5 ABI/INFORM Global p. 35.*

(Continued)

*Primary Examiner* — William Rankins
(74) *Attorney, Agent, or Firm* — Glen R. Farbanish

(57) ABSTRACT

An electronic trading system is described herein. More specifically, the electronic trading system may relate to the substantially simultaneous trading of cash instruments and their related futures contracts for interest-rate related instruments. The electronic trading system may also be used to allow a user (such as a market maker or other suitable participant) to gauge his chance of success at completing both sides of a basis trade within a preferably pre-determined or pre-set interval, while knowing in advance the specific weighting algorithm that will be applied to the basis trade. The electronic trading system may also be used to allow a user to predetermine the exact weighting algorithm to be used on such a basis trade, and to adjust those preferences where necessary or desired.

42 Claims, 5 Drawing Sheets

U.S. PATENT DOCUMENTS

| | | | |
|---|---|---|---|
| 2002/0069156 A1* | 6/2002 | Adam et al. | 705/37 |
| 2003/0018570 A1* | 1/2003 | McCabe et al. | 705/37 |
| 2003/0097328 A1* | 5/2003 | Lundberg et al. | 705/37 |
| 2003/0154158 A1* | 8/2003 | Martyn et al. | 705/37 |
| 2005/0055304 A1 | 3/2005 | Lutnick et al. | |
| 2005/0149429 A1* | 7/2005 | Kemp et al. | 705/37 |
| 2005/0228735 A1* | 10/2005 | Duquette | 705/37 |
| 2006/0229967 A1 | 10/2006 | Sweeting | |
| 2006/0259414 A1* | 11/2006 | Singer et al. | 705/37 |
| 2007/0282734 A1* | 12/2007 | Huntley et al. | 705/37 |

FOREIGN PATENT DOCUMENTS

| | | |
|---|---|---|
| WO | WO 98/49639 | 11/1998 |
| WO | WO 99/26173 | 5/1999 |
| WO | WO 99/27476 | 6/1999 |
| WO | WO 00/03342 | 1/2000 |
| WO | WO 00/08578 | 2/2000 |
| WO | WO 00/39719 | 7/2000 |
| WO | WO 01/09757 | 2/2001 |
| WO | WO 0109757 A2 * | 2/2001 |
| WO | WO 0184419 A1 * | 11/2001 |

OTHER PUBLICATIONS

"A Note: Debunking the Myth of the Risk Free Return" Kawaller, Ira G.; The Journal of Future Markets (1986-1998); Jun. 1987; 7, 3, ABI/INFORM Global; p. 327.*

"Dealing withDerivatives: Handle with Care"; Lich, Herbert; Australian CPA; Jun. 1999; 69, 5; ABI/INFORM Global.p. 48.*

Real-time marketplace gets big boost: New system offers one-stop, one-click basis trading; [National Edition] Barry Critchley. National Post. Don Mills, Ont.: Apr. 17, 2003. p. FP.8.*

Real-time marketplace gets big boost: New system offers one-stop, one-click basis trading; [National Edition] Barry Critchley. National Post. Don Mills, Ont.: Apr. 17, 2003.*

BrokerTec Europe Sets New Daily Volume Record of 2.5 Billion Euros and Launches Fully Electronic Basis Trading PR Newswire. New York: Oct. 12, 2000.*

* cited by examiner

| US 10 YEAR FUTURES | PRICE 115-030 | | FUTURES PER MILLION NOMINAL | |
|---|---|---|---|---|
| | PRICE | CO. FACTOR | CO. FACTOR WT | DURATION WT |
| 1) 5 02/15/11 | 110-05+ | .9468 | 9.468 | 9.468 |
| 2) 5 08/15/11 | 109-31 | .9435 | 9.435 | 9.710 |
| 3) 4 7/8 02/15/12 | 108-30 | .9328 | 9.328 | 9.900 |
| 4) 4 3/8 08/15/12 | 105-05+ | .8979 | 8.979 | 10.019 |
| 5) 4 11/15/12 | 102-10 | .8713 | 8.713 | 10.027 |
| 6) 3 7/8 02/15/13 | 101-04+ | .8601 | 8.601 | 10.514 |
| 7) 3 5/8 05/15/13 | 99-05+ | .8401 | 8.401 | 10.786 |
| 8) 4 1/4 08/15/13 | 98-22 | .8797 | 8.797 | 11.026 |
| 9) 4 1/4 11/15/13 | 103-07+ | .8771 | 8.771 | 11.678 |
| 10) 4 02/15/14 | 101-03+ | .8568 | 8.568 | 12.087 |

ELECTRONIC COMPLETION OF CASH VERSUS FUTURES BASIS TRADES

BACKGROUND OF THE INVENTION

This invention relates to electronic trading systems and methods. More specifically, this invention relates to electronic systems and methods relating to the substantially simultaneous trading of cash instruments and their related futures contracts for interest-rate related instruments.

The following example illustrates a typical futures contract for an interest-related instrument. The Chicago Board of Trade 10 year futures contract is of a delivery standard of a nominal 10 year maturity 6% coupon bond, whereby underlying bonds eligible for delivery into a short position are of a maturity of 6% to 10 years maturity at the first day of each delivery month. Any one of this "basket" of deliverable bonds may be delivered in satisfaction of the seller's obligation under the contract. A basis trade is a trade in which a deliverable cash bond trade is effected at the same time as the equivalent but opposite futures trade.

One advantage of a basis trade is that it provides a hedged position in a particular instrument—i.e., the basis trade includes two substantially opposing positions on similar instruments. The hedged position exists because the futures price tends to track the cash price of the underlying instrument. The hedged nature of the basis trade typically limits losses in situations where long term interest rates fluctuate rapidly.

One aspect that makes basis trading of these underlying bonds against the futures contract difficult to implement electronically is that the futures contract and any one of the basket of deliverable bonds may be traded on distinct and different trading systems, which may incorporate different matching algorithms.

Another aspect is the different hedge ratios of cash bond amount versus futures contract amount that exist for different trading scenarios. Some traders prefer to weight the nominal amounts of each instrument traded in a basis trade by buying or selling an amount of cash bond equivalent to the opposing short or long futures trade by a conversion factor weighting that stipulates the cash amount to be the futures amount multiplied by a Futures Exchange published conversion factor (e.g., 0.9467). Other traders prefer to weight a basis trade according to a duration-based algorithm that matches the different instruments' subtle differences in market price behavior. Other traders still prefer to view the likelihood of one bond being significantly cheaper to deliver into a futures contract short position, and adjust a basis trade hedge ratio according to this likelihood, while considering other market factors as well.

Therefore, it would be desirable to provide a system for the electronic trading of futures contracts for interest-rate related instruments, against their equivalent cash securities as a spread or basis trade whereby both a long or short position in one instrument is traded substantially simultaneously with a short or long position in the other instrument.

Two difficult aspects of the basis trade are the entry into and exit from each position, respectively. At the entry into the position, two things must occur—a trade on the underlying instrument and a trade on the futures. However, from a trader's perspective, it is often difficult if not impossible to make these two trades occur simultaneously. Whereas this simultaneous execution may be difficult to carry out when trading with two different human brokers, the difficulty is amplified in the world of electronic trading where the execution of intended trades depends on the electronic trading system and the trading algorithm resident therein.

Therefore, it would also be desirable to provide electronic trading systems and methods that allow a user (or market maker or other suitable participant) to gauge his chance of success at completing both sides of a basis trade within a preferably pre-determined or pre-set interval, while knowing in advance the specific weighting algorithm that will be applied to the basis trade.

SUMMARY OF THE INVENTION

It is an object of this invention to provide a system for the simultaneous electronic trading of cash instruments and their related futures contracts for interest-rate related instruments.

It is also an object of this invention to provide electronic trading systems and methods that allow a user to predetermine the exact weighting algorithm to be used on such a basis trade, and to adjust those preferences where necessary or desired.

It is yet another object of this invention to provide electronic trading systems and methods that allow a user—e.g., a market maker or other suitable participant—to gauge his chance of success at completing both sides of a basis trade within a preferably pre-determined or pre-set interval.

BRIEF DESCRIPTION OF THE DRAWINGS

The above and other advantages of the invention will be apparent upon consideration of the following detailed description, taken in conjunction with the accompanying drawings, in which like reference characters refer to like parts throughout, and in which:

FIG. 4 is an illustration of another electronic trading interface in accordance with some embodiments of the present invention.

DETAILED DESCRIPTION OF THE INVENTION

Figure 1:
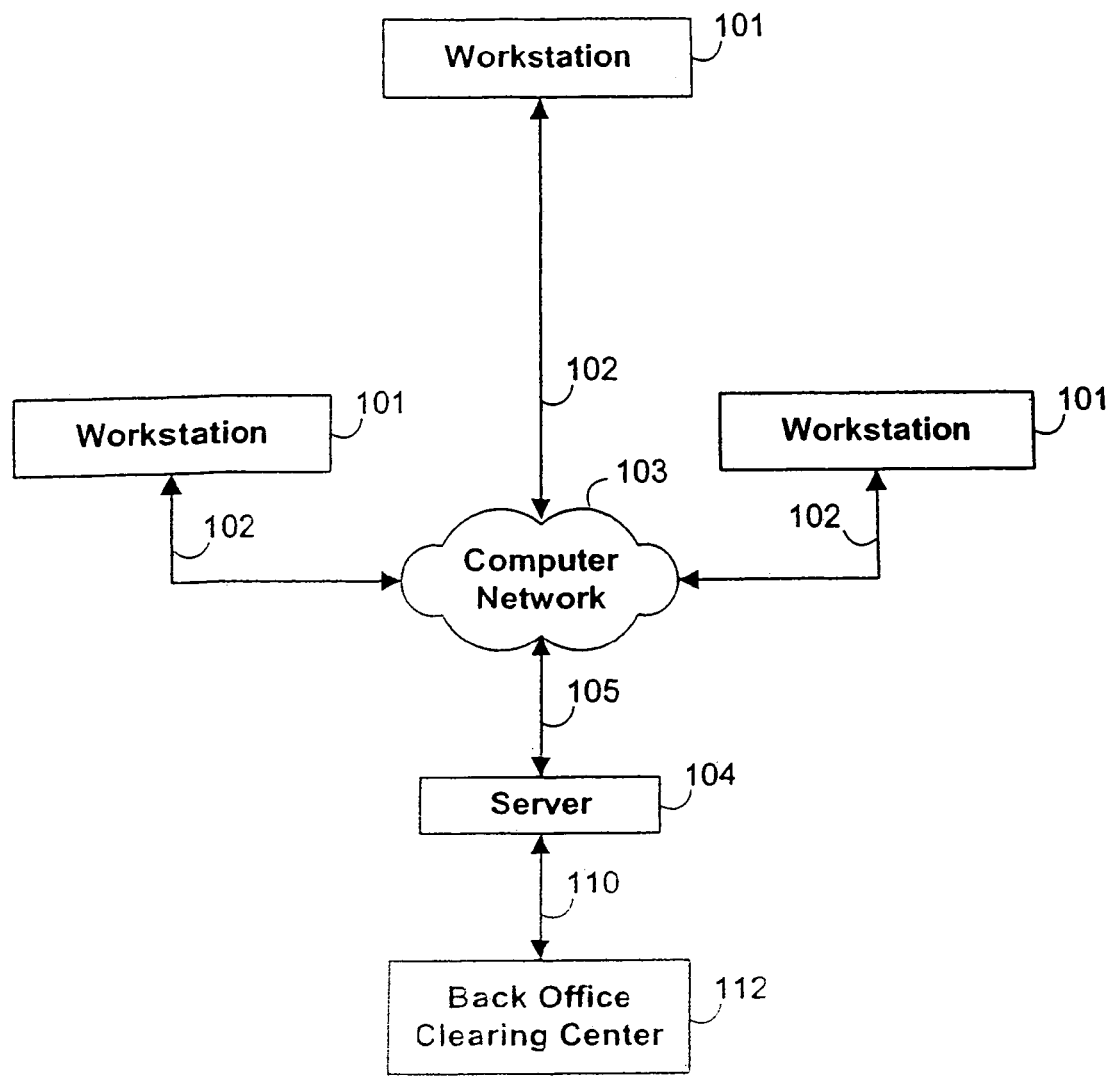
FIG. 1 is an illustration of an electronic implementation of a system in accordance with some embodiments of the present invention.

Referring to FIG. 1, exemplary system 100 for implementing the present invention is shown. As illustrated, system 100 may include one or more workstations 101. Workstations 101 may be local or remote, and are connected by one or more communications links 102 to computer network 103 that is linked via communications links 105 to server 104. Server 104 is linked via communications link 110 to back office clearing center 112.

In system 100, server 104 may be any suitable server, processor, computer, or data processing device, or combination of the same. Server 104 and back office clearing center 112 may form part of the electronic trading system. Furthermore, server 104 may also contain an electronic trading system and application programming interface and merely transmit a Graphical User Interface or other display screens to the user at the user workstation.

Computer network 103 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 102 and 105 may be any communications links suitable for communicating data between workstations 101 and server 104, such as network links, dial-up links, wireless links, hard-wired links, etc.

Workstations 101 may be personal computers, laptop computers, mainframe computers, dumb terminals, data displays, Internet browsers, Personal Digital Assistants (PDAs), two-way pagers, wireless terminals, portable telephones, etc., or any combination of the same. Workstations 101 may be used to implement the electronic trading system application and application programming interface according to the invention.

Back office clearing center 112 may be any suitable equipment, such as a computer, a laptop computer, a mainframe computer, etc., or any combination of the same, for causing transactions to be cleared and/or verifying that transactions are cleared. Communications link 110 may be any communications links suitable for communicating data between server 104 and back office clearing center 112, such as network links, dial-up links, wireless links, hard-wired links, etc.

Figure 2:
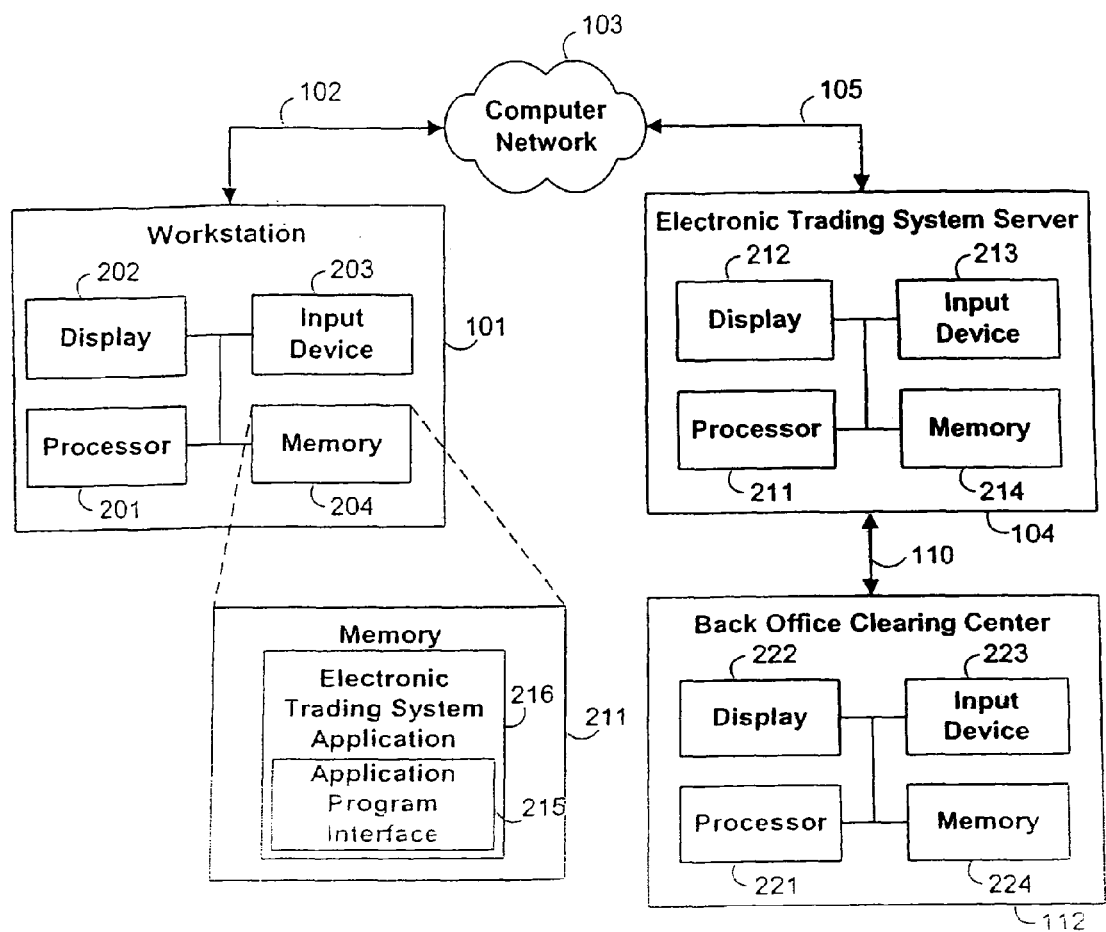
FIG. 2 is an illustration, in greater detail, of an electronic implementation of a system in accordance with some embodiments of the present invention.

The server, the back office clearing center, and one of the workstations, which are depicted in FIG. 1, are illustrated in more detail in FIG. 2. Referring to FIG. 2, workstation 101 may include processor 201, display 202, input device 203, and memory 204, which may be interconnected. In a preferred embodiment, memory 204 contains a storage device for storing a workstation program for controlling processor 201. Memory 204 also preferably contains an electronic trading system application 216 according to the invention.

Electronic trading system application 216 may preferably include application program interface 215, or alternatively, as described above, electronic trading system application 216 may be resident in the memory of server 104. In this embodiment, the electronic trading system may contain application program interface 215 as a discrete application from the electronic trading system application which also may be included therein. The only distribution to the user may then be a Graphical User Interface which allows the user to interact with electronic trading system application 216 resident at server 104.

Processor 201 uses the workstation program to present on display 202 electronic trading system application information relating to market conditions received through communication link 102 and trading commands and values transmitted by a user of workstation 101. Furthermore, input device 203 may be used to manually enter commands and values in order for these commands and values to be communicated to the electronic trading system.

In one embodiment of this invention, Trade-Through-the-Stack trading rules (TTS) preferably allow the user to identify and trade prices outside the boundaries of the best prices shown by the trading system. Such a trade may not invoke the trading system (or alternatively, the trading application's) interactive trading rules as will be described in more detail below. Preferably, price improvement (PI) benefits, which are described in U.S. patent application Ser. No. 10/171,009, filed on Jun. 11, 2002, which is hereby incorporated by reference herein in its entirety, may also be applicable in some form in TTS trading.

To fully understand the TTS system and method according to the invention, which are described in U.S. patent application Ser. No. 10/890,602, filed on Jul. 13, 2004, which is hereby incorporated by reference in its entirety, it is important to understand an interactive trading system according to the invention upon which the TTS rules are implemented. One embodiment of an interactive trading system is described in U.S. Pat. No. 6,560,580, which is hereby incorporated by reference herein in its entirety.

Interactive trading may use a number of trading states to define the ability of users to negotiate and trade with one another. Each of the various states may be associated with a user interface display screen. Alternatively, all of the various states may be associated with a single display screen that includes various indicators to denote the current system state.

Figure 3:
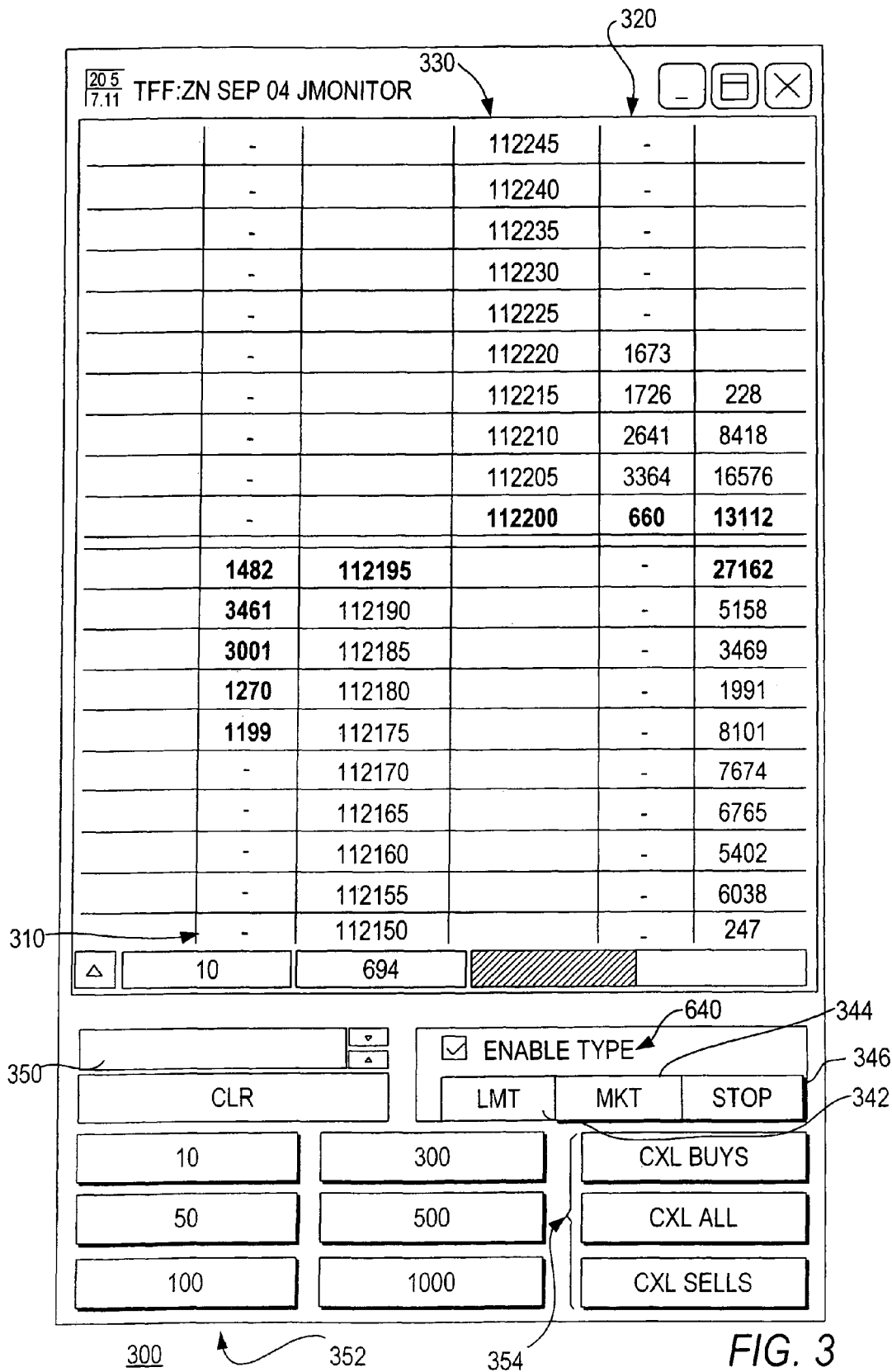
FIG. 3 is an illustration of an electronic trading interface in accordance with some embodiments of the present invention.

FIG. 3 shows a typical display 300 associated with electronic trading of futures contracts for interest-related instruments. Display 300 shows a volume (and corresponding prices) of bids 310 and offers 320 for the Chicago Board of Trade 10-year bond futures. On the left are listed bids 310 and on the right are listed offers 320. The price column 330 is shown in the middle. Order type is shown at 640 and may include limit order 342, market order 344 and stop order 346.

Typically, in conventional trading implemented using display 300, participants enter their respective bids and offers by typing the price and volume in field 350. Size fields 352 may be used to facilitate order entry by making preprogrammed size amounts available. Cancel keys 354 may be used to facilitate canceling active orders.

FIG. 4 shows a typical analytical screen of deliverable bonds to the futures contract in FIG. 3.

Associated with each of the bids and offers is a conversion factor 410. The conversion factor, as stated above, represents the value by which the exchange settlement price of any selected cash bond delivered into a short futures position (at futures contract maturity) will be multiplied by, to arrive at a price the futures buyer will be expected to pay for that bond, in order to satisfy the requirements of the notional bond futures contract. Various reasons exist, and are known in the art, as to why a trader may bid or offer for a futures contract while assuming a particular underlying cash bond is likely to be delivered in the future to satisfy the trader's obligations under the contract.

To the right of each bond are the conversion factors 410, then the conversion factor weightings 416 (amount of futures per $1 m nominal of each bond for a futures conversion factor weighted hedge trade) and then the duration weightings 418 (amount of futures per $1 m nominal of each bond for a futures duration weighted hedge trade) associated with each bond, assuming that the first bond with the shortest duration is the cheapest to deliver bond for the above mentioned short futures obligated participants.

For example, the trader may choose a particular underlying instrument, and its associated conversion factor, because at the time of entry into the futures contract, it is the cheapest for a futures short position to deliver into their delivery obligation, and thus there exists a likelihood that at futures maturity said underlying bond could be most economically delivered into the futures obligation. Alternatively, a trader may choose a particular underlying instrument because he anticipates that at the time of delivery of the contract he will have a surplus of this particular instrument at an advantageous price, and/or that the price of the currently viewed cheapest to deliver instrument is likely to ascend to a relative point where it is no longer cheapest. In any case, various factors contribute to a particular choice of instrument for delivery.

However, as can be seen from the display 400 in FIG. 4, the various conversions factors 410 for various bonds 412 having a price 414. Conversion factors 410 generally lead to a lack of uniformity, and a concomitant lack of liquidity in an electronic marketplace for the simultaneous trading of cash bonds and associated futures contracts. Column 416 shows the conversion factor weighting used to convert the current price into a million dollars of nominal futures contracts. Also, the proprietary nature of futures participant's mathematical modeling of the likelihood of delivery of any of the basket of bonds effectively gives rise to the fact that the last (duration weighting 418) column of the table often has different values in it for each participant. In addition, these conversion factor numbers are typically fixed by the exchange in advance.

Systems and methods according to the invention solve this problem as follows. Typically in the display 400 shown in FIG. 4, trades are executed by a hit or lift of the bid or offer respectively, that is currently being shown. A number of rules that apply to interactive trading relating to the hit/lift system are described in U.S. Pat. No. 6,560,580. While these rules are used herein to illustrate the claimed invention, nevertheless, the scope of the invention extends beyond the electronic systems disclosed therein.

Systems and methods according to the invention propose an additional rule that requires a trader that hits or lifts a futures contract for an interest-rate related instrument to implicitly agree to at least one of the underlying terms—i.e., the hedge ratio proposed for the trade—when the trader hits or lifts a displayed bid or offer. In so doing, any executed trades for a futures contract include an agreement on the terms of satisfaction of the contract—i.e., an agreement as to which hedge ratio bond on the trade is to be used to weight how much of the underlying bond is to be weighted against how many futures contracts.

Using this rule according to the invention, uncertainty is removed from electronic trading of futures contracts for interest-related instruments. According to the invention, each basis trade includes, for every executed trade, an associated hedge ratio which has been implicitly agreed to by the action of the aggressive participant upon the passive resting order. As the trade price is struck at the then current futures price in the open market, the agreed hedge ratio is that of the passive participant, and the aggressive participant can re-adjust their desired hedge ratio with trades in the open markets of the underlying instruments to the basis trade.

The following exemplary calculations may be used as an introduction to one embodiment of the systems and methods described herein (wherein the contracts being traded are a 2-year U.S. Treasury Note, a 2Y Futures contract on the 2-year U.S. Treasury Note, and a 2Y Basis trade is a purchase/sale of the 2-year U.S. Treasury Note and a sale/purchase of the 2-year U.S. Treasury Note Futures Contract):

| In 2Y | a Bid/Offer exists |
| In 2Y | a Futures Bid/Offer exists |

To calculate the basis price:

$$2Y \text{ Basis} = 2Y \text{ Cash} - (2Y \text{ SEP 04 Futures} \times \text{Conversion Factor})$$

$$2Y \text{ Basis} = 100.116 - (105.226 \times 0.9467)$$

$$\begin{array}{ccc} \text{Cash} & \text{Future} & \text{Conversion} \\ \text{Price} & \text{Price} & \text{Factor} \end{array}$$

$$2Y \text{ Basis} = .499$$

Alternatively, the following calculations may be used according to the invention:

$$2Y \text{ Basis Bid} = 2Y \text{ Cash Bid} - (2Y \text{ Futures Offer Price} \times \text{Conversion Factor})$$

$$2Y \text{ Basis Offer} = 2Y \text{ Cash Offer} - (2Y \text{ Futures Bid Price} \times \text{Conversion Factor})$$

To buy the basis = Buy Cash/Sell Futures

To sell the basis = Sell Cash/Buy Futures

Preferably, a market maker takes the following exemplary steps to provide a bid in the basis contract (and the opposite steps to provide an offer):

$$\text{If a participant enters a Basis Bid of} = 11\frac{1}{2}$$

$$11\frac{1}{2} = \text{Buy Cash and Sell Future} \times \text{Conversion Factor}$$

$$= 11\frac{1}{2}$$

Once a known price is offered for futures—then the user can make a bid for the cash instrument on the participant's behalf. Alternatively, using the equation set forth above, a market maker can "make"—i.e., provide to other participants—a bid and offer in the basis trade by: 1) determining the available price in the cash market 2) using the invention (as described in more detail below) to determine the availability of the futures contracts and 3) provide a bid and an offer in the basis market based on steps 1 and 2.

Figure 5:
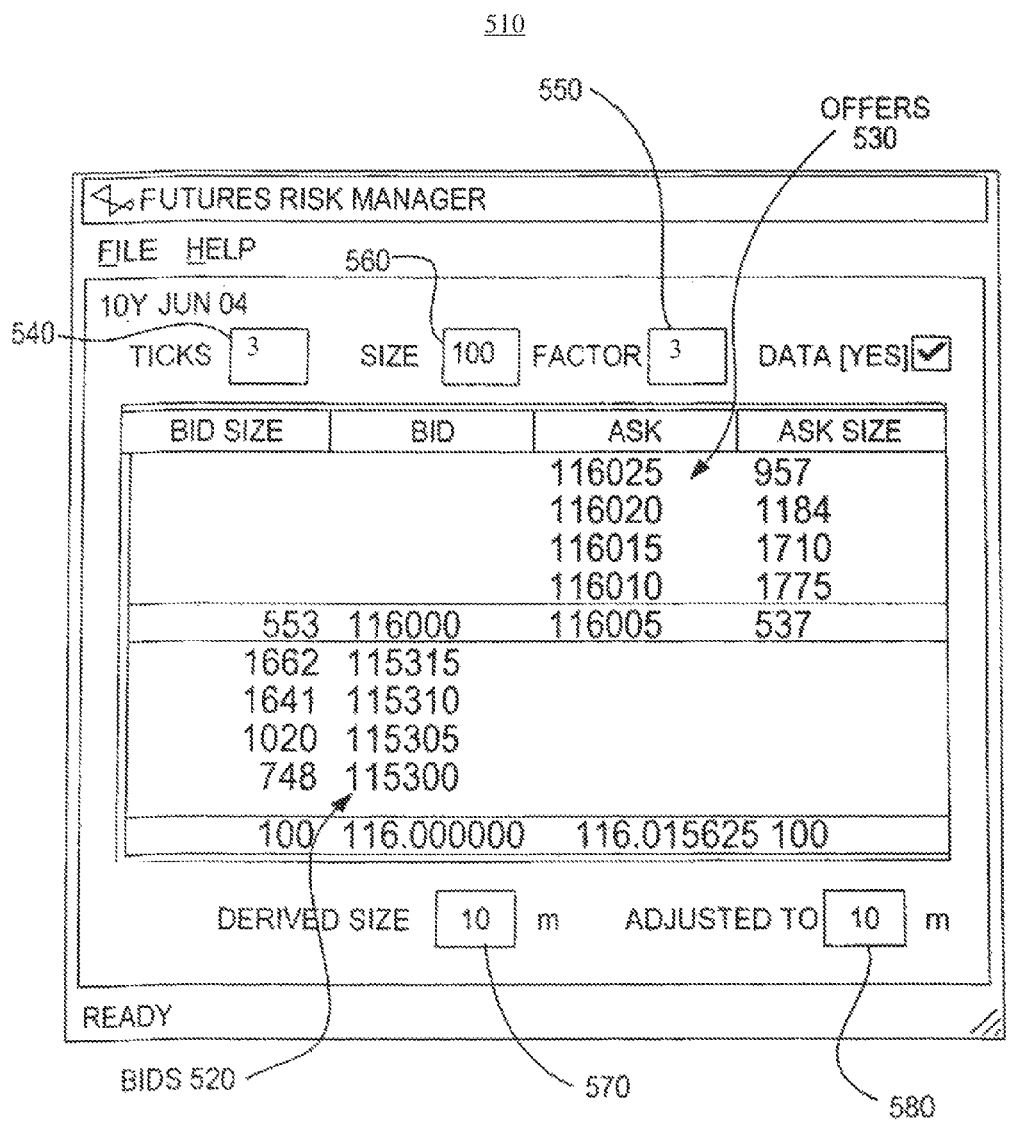
FIG. 5 is an illustration of yet another electronic trading interface in accordance with some embodiments of the present invention.

FIG. 5 shows a display 510 directed to determining the risk associated with various steps of the process described above according to the invention. This embodiment of basis trading relates to the simultaneous execution of both the cash bond trade and the futures trade on different trading systems, in accordance with the users' preferred hedge ratio. This method of basis trading can be used, in one instance, to effect a basis trade in the underlying markets when there is no counterparty willing to take on the opposite side of the basis trade as above. According to this method, a cash bond bid or offer may be placed at a level that the accompanying and opposing futures trade should be also executable. If the cash trade was executed, the system will automatically trade the offsetting futures trade in that market. Because these cash and futures trading systems are likely to be on different trading systems, a form of risk management is preferred to allow users to adjust the risk of executing one side only, or partially executing one side, of the desired basis trade while taking on the risk of the other side of the market. This method may also be used in simultaneous arbitrage trading, whereby advantageous execution prices can be sourced from these individual cash and futures trading systems by rapid execution of matched buy and sell orders. As an example, a future risk manager may weight the current market conditions associated with the futures for use in the algorithm and therefore adjusts the price for the bid in cash that the system makes on behalf of the basis bidder. Therefore, once the price/availability of the futures using a future risk manager according to the invention is obtained, a user can determine a cash price based thereon and post a basis spread bid/offer. Systems and methods for completing a trade for multiple instruments substantially simultaneously is disclosed in co-pending U.S. patent application Ser. No. 09/627,705 filed on Jul. 28, 2000.

A detailed description of FIG. 5 may be used to more fully illustrate particular aspects of a futures risk management system and method according to the invention. Display 510 includes a list of bids 520 and offers 530 for futures contracts. Display 510 also shows three boxes, which represent user configurable fields may be used to gauge the chance of success at completing simultaneously both sides of a basis trade (or other suitable spread trade). Preferably, in one embodiment of the invention, the system preferably works with a limit order or any other suitable order type. Otherwise, the system works with market orders. The chances of successfully completing the trade may be measured with respect to a preferably pre-determined or pre-set time interval, which in modern electronic trading systems may typically be measured in a few hundredths of a second to those skilled in the art. Thus, systems and methods according to the invention preferably provide a user-configurable risk mechanism for use in performing a basis trade, a spread trade or for other suitable trades.

The invention may be used for the following purpose. A market maker in a basis trade may use the invention to provide a price in the basis trade as follows.

Risk ticks 540 may be a user-configurable field. Ticks measure volatility and function as a volatility adjustment parameter. The more volatile the market, the less orders per tick. In this embodiment, risk ticks 540 preferably indicates the level of depth in a market that the user may be willing to probe for an availability of prices and sizes for contracts to complete the basis trade. Specifically, a risk tick level of three, as shown in FIG. 5, may indicate that the trader desires an average bid and offer associated with the top three bids (highest dollar value) and/or the bottom three offers (lowest dollar value) in order to gauge the size and price of the available market for futures contracts for the five-year treasury note that is due to be delivered in March 2004. Risk ticks effectively stipulates how many price levels a user wishes to probe to determine market depth in the calculation algorithms that follow.

Risk size 560 may be a user-configurable field as well. In this embodiment, risk size 560 may define the pre-determined quantity of the derivative instrument for which a user wishes to determine availability. When used in conjunction with the rest of the parameters in the systems and methods according to the invention, the user can tailor a risk profile to suit the user's desired trading and market volatility parameters.

Risk factor 550 may also be a user-configurable field. The risk factor adjusts the risk exposure without sending a larger order up to a linking machine which may be configured to post either one or both of the orders for trading. More particularly, the risk factor defines an excess amount of the derivative instrument over which availability is tested. This gives the linking machine the control of the risk before exposing a position to the market. (One embodiment of a suitable linking machine or engine is described in U.S. patent application Ser. No. 09/627,705 filed Jun. 28, 2000 which is hereby incorporated by reference herein in its entirety.) Thus, risk factor 550 limits the exposure of the user to real market risk.

In this embodiment, risk factor 550 preferably indicates a multiple of one side of the basis trade with respect to the other side of the basis trade. For example, a risk factor of three in this example indicates that for the order of one hundred contracts in the cash market (shown in 560), a cost/price average—i.e., the average price that is being determined for the selected bids or offers for the instrument that is being derived—for three hundred equivalent contracts should be taken in the futures market to determine the availability of contracts in the futures market at the required price, or close to the required price, to risk showing a cash price and size for trading in a cash bond trading system, to complete both sides of a basis trade. The higher the risk factor 550, the less the trader is exposed to risk because the indication that he receives with respect to the available contracts illustrates a wider sampling of the market, and thus a lower risk profile and concomitantly lower chance of only executing a cash bond trade without the "balancing" accompanying futures trade. Thus, the risk factor limits the exposure by increasing the cover without increasing the order.

It should be noted that if the risk factor requests a measure of availability to be determined over a particular number of contracts and the risk ticks specifies a number of ticks that does not include sufficient volume to satisfy the number of contracts requested by the risk factor, then systems and methods according to the invention may reject the submitted risk profile because the market is not sufficiently liquid to support the user's risk profile.

A derived size limit 570 may be a further parameter that the user can adjust in the cash bond market to minimize or increase the desired risk profile. If the risk ticks 540, risk factor 550 and risk size 560 provide a price and size that is at the best price (while taking into account the risk analysis) in the cash market, a limit may be applied as to how much derived size should be shown, to either minimize possible sudden losses due to extraordinary market movements, or to aggressively show as much derived size as possible to maximize a user's probability of execution. This limit may be implemented using derived size limit 570.

Finally, if derived size limit 570 is not calculated at a marketable price reflective of the then best bid or offer in the market—i.e., it is of a worse price than currently displayed on the cash instrument preferably in order to protect the user—then the derived size 570 can be preferably automatically reduced by the system down to an adjusted reduced derived size 580 that enables the algorithm to calculate a better price that is closer to the then best market bid or offer price, in accordance with the user's settings of risk ticks 540, risk factor 550 and risk size 560.

Thus a trader can parameterize the system to use any combination of risk ticks, risk factor, risk size, derived size limit and adjusted reduced derived size to form his risk assessment vis-à-vis the selected contracts. In one embodiment of the invention, the cost price average of the futures size stack for the desired amount multiplied by the risk factor provides the user with an indication of the availability of contracts at the price that the user needs to complete the basis trade. As described above, in one embodiment of the situation according to the invention, the higher the risk factor, the less risk is involved from the side of the trader.

In another embodiment of the invention, the risk factor may be adjustable according to bid/offer tick volatility and/or time of day—e.g., a risk factor may be configured to be higher between 8:28 a.m. and 8:35 a.m. on days in which economic figures are set to be reported. Preferably, the risk factor can also be manually overridden in real time by a trader.

In cash trading systems that use a principle of first buyer and first seller priority workup (as described in U.S. Pat. No. 6,560,580), an embodiment of the system may be implemented to take advantage of any trading privileges afforded to the user in deciding whether to trade more at a price when executed. If a user at the point of a cash trade enjoys specific privileged trading rights over further cash size proffered in the trading system, the system may trade more futures first—thus reversing the derived order flow—because of the changed risk dynamic associated with an exclusive priority over further cash trading size. Rather than bid for or offer more cash size according to the futures price and size available to the system (as adjusted by the combination of risk ticks, risk factor, risk size, derived size limit and adjusted reduced derived size), the system can use the exclusive trading rights to further cash size to execute first a determined amount of futures, and then the cash instrument. The futures amount to trade is determined by the available cash size exclusively proffered to the application, adjusted either by the risk factor only, or by any of the suitable feature, as described above. In a certain embodiment of the priority matching where anti-gaming rules of the cash trading system dictate the proffered size that is unable to be cancelled, the trading system has thus guaranteed the priority buyer or seller an execution of the proffered size. In this embodiment, the risk factor is automatically set to a value of one, and the amount of futures thence traded is equal to just the cash amount modified by the user's hedge ratio amount—be that conversion factor weighted, duration weighted, or weighted by any proprietary model used as introduced above.

Thus, it will be understood that the foregoing is only illustrative of the principles of the invention, and that various modifications can be made by those skilled in the art without departing from the scope and spirit of the invention, and the present invention is limited only by the claims that follow.

What is claimed is:

1. A method, comprising:
    receiving, by a processor of a computer, trading information for a first financial instrument from a first trading system, in which the first financial instrument may be traded with a second financial instrument in a second trading system using at least one conversion factor;
    determining, by the processor, a second quantity of the first financial instrument by multiplying a first quantity of the first financial instrument by a risk factor;
    selecting, by the processor, from the trading information, one or more available orders for the first financial instrument based on a value that defines a number of price levels;
    determining, by the processor, an availability of the second quantity of the first financial instrument over the one or more available orders for the first financial instrument, in which the one or more available orders comprises a best available order; and
    determining, by the processor, a price average for the first financial instrument based on the availability of the second quantity of the first financial instrument over the one or more available orders;
    in which an order price and size for the second financial instrument is provided in the second trading system based at least in part on the price average and the at least one conversion factor.

2. The method of claim 1,
    in which an order size for the first financial instrument is provided in the first trading system.

3. The method of claim 1, in which the first financial instrument is traded in a futures market and the second financial instrument is traded in a cash market.

4. The method of claim 1, in which the order for the second financial instrument is placed in a cash market.

5. The method of claim 1,
    in which execution of a parallel trade of an order for the first financial instrument is attempted in the first trading system.

6. The method of claim 5, in which the parallel trade comprises a sale of a quantity of the first financial instrument in a futures market.

7. The method of claim 5, in which the parallel trade comprises a purchase of a quantity of the first financial instrument in a futures market.

8. The method of claim 1, in which the first financial instrument comprises an offsetting financial instrument to the second financial instrument.

9. The method of claim 1, in which the second financial instrument comprises a security and the first financial instrument comprises a derivative based at least in part on the security.

10. The method of claim 1, in which the first financial instrument comprises a security and the second financial instrument comprises a derivative based at least in part on the security.

11. The method of claim 1,
    in which the one or more available orders for the first financial instrument comprises one or more available bids for the first financial instrument; and
    in which the order price and size for the second financial instrument comprises an offer price and size for the second financial instrument.

12. The method of claim 1,
    in which the one or more available orders for the first financial instrument comprises one or more available offers for the first financial instrument; and
    in which the order price and size for the second financial instrument comprises a bid price and size for the second financial instrument.

13. The method of claim 1, further comprising:
    receiving, by the processor, from a user at an electronic trading interface, at least one of:
        the first quantity,
        the risk factor, and
        the value that defines the number of price levels.

14. The method of claim 1, in which determining the price average comprises determining the price average for the full amount of the second quantity of the first financial instrument.

15. An apparatus, comprising:
    a processor; and
    a memory electronically coupled to the processor and comprising a program that when executed by the processor configures the processor to:
    receive trading information for a first financial instrument from a first trading system, in which the first financial instrument may be traded with a second financial instrument in a second trading system using at least one conversion factor;
    determine a second quantity of the first financial instrument by multiplying a first quantity of the first financial instrument by a risk factor;
    select, from the trading information, one or more available orders for the first financial instrument based on a value that defines a number of price levels;
    determine an availability of the second quantity of the first financial instrument over the one or more available orders for the first financial instrument, in which the one or more available orders comprise a best available order; and
    determine a price average for the first financial instrument based on the availability of the second quantity of the first financial instrument over the one or more available orders;
    in which an order price and size for the second financial instrument is provided in the second trading system based at least in part on the price average and the at least one conversion factor.

16. The apparatus of claim 15, in which an order size for the first financial instrument is provided in the first trading system.

17. The apparatus of claim 15, in which the first financial instrument is traded in a futures market and the second financial instrument is traded in a cash market.

18. The apparatus of claim 15, in which the order for the second financial instrument is placed in a cash market.

19. The apparatus of claim 15, in which execution of a parallel trade of an order for the first financial instrument is attempted in the first trading system.

20. The apparatus of claim 19, in which the parallel trade comprises a sale of a quantity of the first financial instrument in a futures market.

21. The apparatus of claim 19, in which the parallel trade comprises a purchase of a quantity of the first financial instrument in a futures market.

22. The apparatus of claim 15, in which the first financial instrument comprises an offsetting financial instrument to the second financial instrument.

23. The apparatus of claim 15, in which the second financial instrument comprises a security and the first financial instrument comprises a derivative based at least in part on the security.

24. The apparatus of claim 15, in which the first financial instrument comprises a security and the second financial instrument comprises a derivative based at least in part on the security.

25. The apparatus of claim 15,
in which the one or more available orders for the first financial instrument comprises one or more available bids for the first financial instrument; and
in which the order price and size for the second financial instrument comprises an offer price and size for the second financial instrument.

26. The apparatus of claim 15,
in which the one or more available orders for the first financial instrument comprises one or more available offers for the first financial instrument; and
in which the order price and size for the second financial instrument comprises a bid price and size for the second financial instrument.

27. The apparatus of claim 15, in which the program that when executed by the processor further configures the processor to:
receive from a user at an electronic trading interface, at least one of:
the first quantity,
the risk factor, and
the value that defines the number of price levels.

28. The apparatus of claim 15, in which determining the price average comprises determining the price average for the full amount of the second quantity of the first financial instrument.

29. A tangible computer readable medium comprising a program that when executed by a processor configures the processor to:
receive trading information for a first financial instrument from a first trading system, in which the first financial instrument may be traded with a second financial instrument in a second trading system using at least one conversion factor;
determine a second quantity of the first financial instrument by multiplying a first quantity of the first financial instrument by a risk factor;
select, from the trading information, one or more available orders for the first financial instrument based on a value that defines a number of price levels;
determine an availability of the second quantity of the first financial instrument over the one or more available orders for the first financial instrument, in which the one or more available orders comprise a best available order; and
determine a price average for the first financial instrument based on the availability of the second quantity of the first financial instrument over the one or more available orders;
in which an order price and size for the second financial instrument is provided in the second trading system based at least in part on the price average and the at least one conversion factor.

30. The computer readable medium of claim 29, in which an order size for the first financial instrument is provided in the first trading system.

31. The computer readable medium of claim 29, in which the first financial instrument is traded in a futures market and the second financial instrument is traded in a cash market.

32. The computer readable medium of claim 29, in which the order for the second financial instrument is placed in a cash market.

33. The computer readable medium of claim 29, in which execution of a parallel trade of an order for the first financial instrument is attempted in the first trading system.

34. The computer readable medium of claim 33, in which the parallel trade comprises a sale of a quantity of the first financial instrument in a futures market.

35. The computer readable medium of claim 33, in which the parallel trade comprises a purchase of a quantity of the first financial instrument in a futures market.

36. The computer readable medium of claim 29, in which the first financial instrument comprises an offsetting financial instrument to the second financial instrument.

37. The computer readable medium of claim 29, in which the second financial instrument comprises a security and the first financial instrument comprises a derivative based at least in part on the security.

38. The computer readable medium of claim 29, in which the first financial instrument comprises a security and the second financial instrument comprises a derivative based at least in part on the security.

39. The computer readable medium of claim 29,
in which the one or more available orders for the first financial instrument comprises one or more available bids for the first financial instrument; and
in which the order price and size for the second financial instrument comprises an offer price and size for the second financial instrument.

40. The computer readable medium of claim 29,
in which the one or more available orders for the first financial instrument comprises one or more available offers for the first financial instrument; and
in which the order price and size for the second financial instrument comprises a bid price and size for the second financial instrument.

41. The computer readable medium of claim 29, in which the program that when executed by the processor further configures the processor to:
receive from a user at an electronic trading interface, at least one of:
the first quantity,
the risk factor, and
the value that defines the number of price levels.

42. The computer readable medium of claim 29, in which determining the price average comprises determining the price average for the full amount of the second quantity of the first financial instrument.

* * * * *